United States Patent [19]

Albin

[11] Patent Number: 4,611,241

[45] Date of Patent: Sep. 9, 1986

[54] PROJECTION TELEVISION SET UP METHOD AND APPARATUS

[75] Inventor: William W. Albin, Itasca, Ill.

[73] Assignee: Zenith Electronics Corporation, Glenview, Ill.

[21] Appl. No.: 541,388

[22] Filed: Oct. 12, 1983

[51] Int. Cl.$^4$ .............................................. H04N 9/31
[52] U.S. Cl. ......................................... 358/60; 358/64
[58] Field of Search ..................... 358/10, 60, 237, 56, 358/64

[56] References Cited

U.S. PATENT DOCUMENTS

| | | | |
|---|---|---|---|
| 3,969,648 | 7/1976 | Hergenrother et al. | 358/64 |
| 4,297,619 | 10/1981 | Kiteley | 358/60 |
| 4,414,567 | 11/1983 | Berke et al. | 358/10 |
| 4,432,011 | 2/1984 | Lehnert | 358/60 |

Primary Examiner—James J. Groody
Assistant Examiner—Randall S. Svihla

[57] ABSTRACT

A three tube projection color television system for use with a remote viewing surface is set up by applying a distinct white vertical bar pattern video signal comprising a delayed horizontal pulse to the CRT video drive circuits and changing the relative position between the CRT's and the remote viewing surface while observing the convergence of the distinct white vertical bar pattern on the remote viewing surface.

11 Claims, 6 Drawing Figures

PROJECTION TELEVISION SET UP METHOD AND APPARATUS

BACKGROUND OF THE INVENTION AND PRIOR ART

This invention relates in general to projection color television systems and specifically to such systems wherein the viewing surface is remote from the projection CRT.

Large screen color television receivers are becoming increasingly popular, with many being housed in a single cabinet with a lens system for optically projecting images on a large viewing screen affixed to the cabinet. Such systems do not require "set up" for proper convergence of the three color images because the position of the projecting CRT's and the viewing screen is fixed during manufacture.

An increasing number of large screen projection television systems have the viewing screen remotely positioned with respect to the projecting CRT's and therefore need to be set up. Many of these systems are designed for projection on any large, flat, light-colored surface such as the wall of an ordinary home, although special reflective screens yield a substantial increase in brightness. In these systems, the distance between the projecting CRT's and the wall or viewing screen is critical since convergence of the different color images is necessary to produce an optimum picture for viewing.

The prior art solutions to setting up such systems have included specifying that the distance to the viewing surface be measured off, supplying a string or tape of proper length for locating the projector with respect to the viewing surface and providing a separate optical system for determining the proper distance by focusing a projected light pattern on the viewing surface. Each of the prior art systems is either cumbersome, inaccurate, expensive or difficult to use. None of them is economical, accurate and simple to use. Accordingly, there is a need in the art for a simplified method and apparatus for set up of a projection color television system for use with a remote viewing surface.

OBJECTS OF THE INVENTION

A principal object of the invention is to provide an improved projection television system.

Another object of the invention is to provide a projection television system for use with a remote viewing surface that is simple for the user to set up.

A further object of the invention is to provide a projection television system for use with a remote viewing surface in which the correct distance between the viewing surface and the projection CRT's is readily determined.

SUMMARY OF THE INVENTION

In accordance with the method and apparatus of the invention, the projection CRT's of a projection color television system are positioned the correct distance from a remote viewing surface by applying a distinct video signal to the inputs of the CRT drivers and adjusting the distance between the viewing surface and the projection CRT's while observing the misconvergence of the distinct video pattern displayed.

DESCRIPTION OF THE DRAWINGS

Other objects and advantages of the invention will become apparent upon reading the following description in conjunction with the drawing in which.

DESCRIPTION OF THE PREFERRED EMBODIMENT

Figure 1:
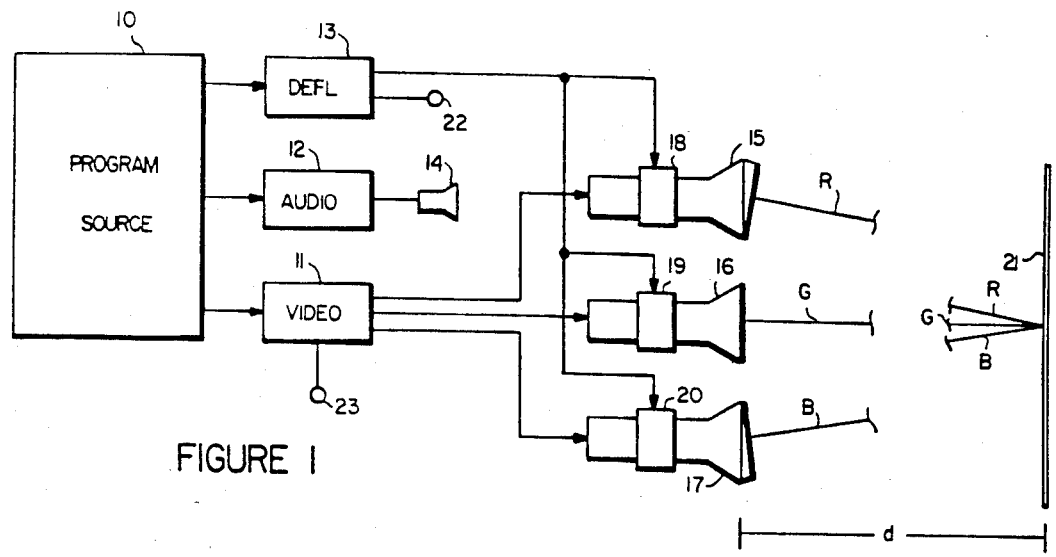
FIG. 1 is a simplified block diagram of a projection television system with a remote viewing surface.

In FIG. 1, a program source 10 is illustrated as supplying appropriate electrical signals to a video circuit 11, an audio circuit 12, and a deflection circuit 13. Audio circuit 12, in turn, is coupled to a speaker 14 for reproducing the audio accompaniment of the program being viewed. The deflection circuit is conventional, as is the video circuit, which will be understood to include a plurality of video driver stages for developing the large video currents required by the CRT's. Three projection CRT's 15, 16 and 17 are illustrated with CRT's 15 and 17 having angled faceplates. It will be appreciated that each of the CRT's is dedicated to a different color. The colors are generally red, green and blue and, accordingly each CRT includes a faceplate that is coated with an appropriate colored light-emitting phosphor. Further, as fully described in U.S. Pat. No. 4,274,110 issued June 16, 1981 to S. Lehnert and assigned to Zenith Radio Corporation, the faceplates of the "outboard" tubes 15 and 17 may be tilted to produce convergence of the projected color images at a remote point without the need for external lenses. The axes of the CRT's are preferably located in the same horizontal plane which eliminates the problem of convergence in the vertical direction. The CRT's also include deflection yokes 18, 19 and 20 that are individually supplied from deflection circuit 13. A flat viewing surface or screen 21 is indicated as being a distance "d" from the projection CRT's. When the distance "d" is correct, the three images projected by CRT's 15, 16 and 17 will converge on the viewing surface, that is they will overlie or be in registry with each other.

Program source 10 may comprise a conventional television receiver "front end", that is a tuner, IF and detector. It may also comprise a video recorder or any other suitable source of video material having synchronizing information for controlling the deflection circuitry. It will be recognized that the described projection television system is substantially similar to prior art systems, with the exception of a terminal 22 connected to deflection circuit 13 and a terminal 23 coupled to the driver stages (not shown) in video circuit 11.

Figure 2:
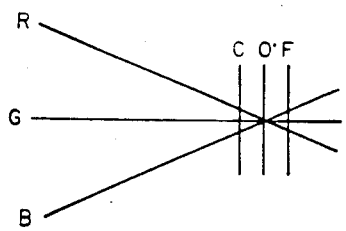
FIG. 2 is a graphical representation of the misconvergence caused by an improper distance to the viewing surface in the system of FIG. 1.

FIG. 2 is a graphical representation of the effect of varying the distance between the viewing surface and the projection CRT's on the convergence of the three images. For simplicity, three signal beams labelled R, G, and B are shown. At the center position labelled O, the beams are properly converged. At a distance closer to the CRT's as indicated by the letter C, the beams are misconverged in one direction and at a distance farther from the CRT's, as indicated by the letter F, the beams are misconverged in the opposite direction.

Figure 3:
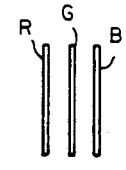
FIG. 3 shows the video pattern observed with the invention when the projection CRT's are too close to the viewing surface.

As will be seen, a distinct video signal is applied to terminal 23 of the video circuit for generating a white vertical bar near the center of the viewing surface. FIG. 3 illustrates the pattern of this distinct video signal, as observed by a viewer, where the distance between the projection CRT's and the viewing surface is insufficient (position C). A red bar will be on the left, a green bar will be in the center and a blue bar will be on the right.

Figure 4:
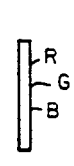
FIG. 4 shows the video pattern displayed when the distance between the projection CRT's and the viewing surface is correct.

In FIG. 4, a solid white bar is seen when the distance is correct, that is, when the viewing surface is properly located with respect to the projection CRT's. Here, of course, the three individual color bars overlie each other in registry and form a single white bar. The bar is shown to be wider than the individual color bars to emphasize the overlying relationship.

Figure 5:
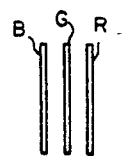
FIG. 5 shows the video pattern displayed when the projection CRT's are too far from the viewing surface.

FIG. 5 correspondingly illustrates the pattern seen by the viewer when the distance between the projection CRT's and the viewing surface is too great. Here the blue bar is to the left, and the red bar is to the right. The green bar, of course, remains in the center.

Figure 6:
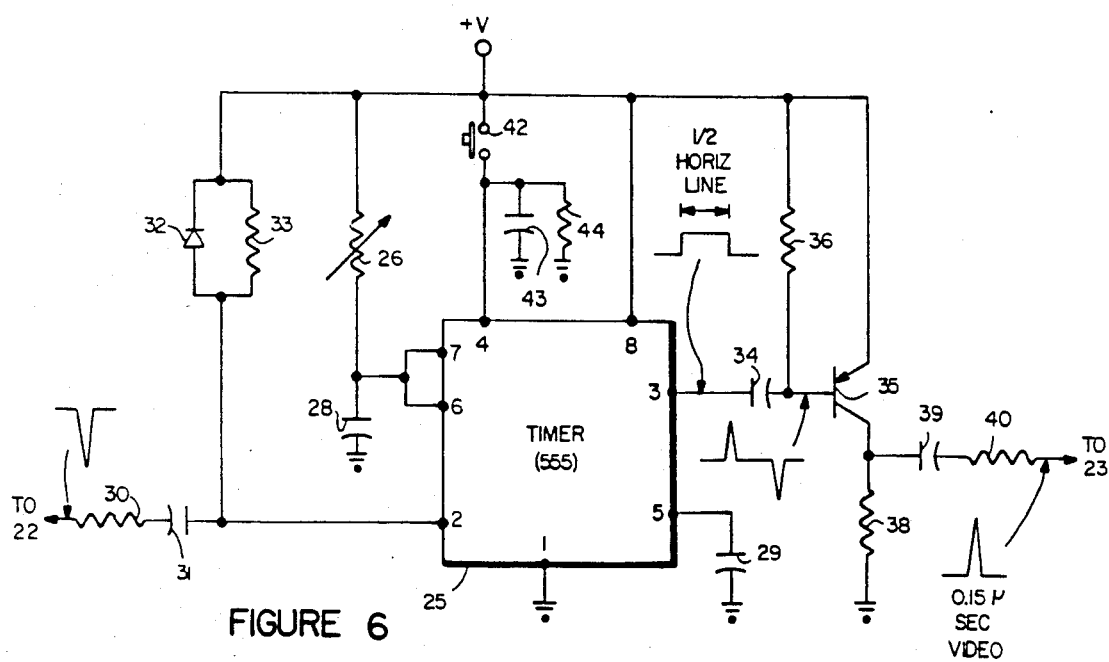
FIG. 6 is a schematic diagram of the circuitry used in the invention.

FIG. 6 illustrates the pattern means used to derive the distinct video signal for application to the video drivers to produce the white vertical bar pattern in the center of the viewing surface. The circuit uses an off-the-shelf type 555 timer identified by reference character 25. The numbers indicated adjacent the pin terminals of timer 25 correspond to the actual pin numbers on the commercial type 555 chip. Pin 1 is grounded, pin 5 is coupled to ground through a capacitor 29 and pin 8 is coupled to a source of +V voltage. These are operating connections with the capacitor being required for monostable operation of the timer. The timer is essentially a monostable flip-flop and its timing is set by a variable resistance 26 connected in series with a capacitor 28, the combination being connected between +V and ground, with the junction being connected to pins 6 and 7 of the timer. Variable resistor 26 is adjusted to provide approximately a one-half horizontal line delay (about 31 microseconds). The parallel connection of a diode 32 and a resistor 33 is coupled between +V and pin 2 to clamp positive-going signals. A resistor 30 and a capacitor 31 are serially connected between terminal 22 on the deflection circuit (FIG. 1) and pin 2 of timer 25 for supplying a horizontal pulse to the timer. The output of timer 25, taken from pin 3, comprises a square wave of approximately one-half horizontal line duration, and is supplied to a differentiating network consisting of a series connected capacitor 34 and a resistor 36. Resistor 36 is connected to +V and its junction with capacitor 34 is connected to the base input of a PNP transistor 35. The emitter of transistor 35 is connected to +V and its collector is connected to ground through a resistor 38. The output signal is taken from the collector of transistor 35 and supplied through a capacitor 39 and a resistor 40 to terminal 23 of video circuit 11 (FIG. 1).

As illustrated by the various waveforms shown on the circuit, the output of timer 25 comprises a positive-going square wave of one-half horizontal line duration that is integrated by capacitor 34 and resistor 36 to provide the narrow positive and negative-going signals at the base of transistor 35. Since transistor 35 is a PNP type, the positive-going signal has no effect on its conductivity. The negative-going signal drives transistor 35 conductive, which makes its collector positive. The result is a one-half horizontal line-delayed positive going output pulse of approximately 0.15 microsecond duration, which comprises the distinct video signal. This video signal produces the distinct white vertical bar pattern of FIG. 4 when the distance between the projection CRT's and the viewing surface is correct, and the three color bar patterns of FIGS. 3 and 5 when it is incorrect.

As is well known, the power required to project a television image on a large, remote viewing surface is substantial. Most projection CRT's even include means for cooling their faceplates to prevent damage. The presence of the very bright white bar could adversely affect the projection CRT's, especially if the pattern was allowed to persist for too long a time. To avoid inadvertent damage to the CRT's, an automatic switching arrangement is employed in the circuit of FIG. 6.

A momentary contact push button switch 42 is connected between +V and pin 4. The "cold" terminal of the switch is connected to ground through the parallel combination of a capacitor 43 and a resistor 44. Thus a charging circuit is formed which permits a momentary closure of switch 42 to develop a sufficient charge in capacitor 43 to maintain timer 25 operable for a preselected period of time. The time period (approximately fifteen seconds) is long enough to enable positioning of the projection television unit relative to the viewing surface (or vice versa) while observing the pattern. However it is not so long as to result in any damage to the CRT's. After fifteen seconds, the capacitor will have sufficiently discharged to disable the timer and remove the output signal from transistor 35. Should set up not be complete, the viewer may momentarily depress the switch again to initiate another fifteen second operation cycle.

What has been described is a novel set up arrangement for a projection color television system having a remote viewing surface. It is recognized that numerous changes and modifications in the described embodiment of the invention will be apparent to those skilled in the art without departing from the true spirit and scope thereof. The invention is to be limited only as defined in the claims.

I claim:

1. A projection television system comprising:
a plurality of different colored light-emitting CRT's for projecting individual color images in overlying relationship on a remote viewing surface;
driver means supplying video signals to said CRT's;
pattern means for developing a distinct video signal; and
means for applying said distinct video signal to said driver means for producing a corresponding white vertical bar pattern, made up of different colored images, on said viewing surface for determining the proper distance between said CRT's and said viewing surface by observation of a departure of said different colored images from said overlying relationship in said white vertical bar pattern.

2. The system of claim 1, further including a horizontal deflection circuit producing regularly spaced horizontal pulses, wherein said pattern means is coupled to said horizontal deflection circuit.

3. The system of claim 2 wherein said pattern means include timing means interposed between said deflection circuit and said driver means for generating said distinct video signal in the form of a delayed horizontal pulse of given duration.

4. The system of claim 3 further including switch means for restricting the duration of operation of said pattern means.

5. The system of claim 4 wherein said pattern means further includes a transistor amplifier and wherein said timer means includes a type 555 integrated circuit having an input coupled to said deflection circuit and an output coupled to said transistor amplifier.

6. The system of claim 5 wherein said transistor amplifier includes a differentiating network in its input circuit.

7. A projection television system comprising:
   a plurality of different colored light-emitting CRT's for projecting individual color images in overlying relationship on a remote viewing surface;
   driver means supplying video signals to said CRT's;
   a horizontal deflection circuit for generating regularly spaced horizontal deflection pulses;
   timer means coupled to said horizontal deflection circuit for generating a delayed horizontal pulse of given duration; and
   means for applying said delayed horizontal pulse to said driver means for developing a white vertical bar pattern made up of different colored images on said remote viewing surface for enabling setting of the proper distance between said remote viewing surface and said CRT's by observing a departure of said different colored images in said white vertical bar pattern from said overlying relationship.

8. The system of claim 7 further including switch means for restricting the duration of operation of said timer means.

9. The system of claim 8 wherein said switch means comprises a momentary contact switch and a resistor-capacitor charging circuit coupled between said timer means and a source of potential.

10. A method of setting up a projection television system having a plurality of colored light-emitting CRT's for projecting corresponding different color images in overlying relationship on a remote viewing surface comprising the steps of:
    developing a distinct video signal in response to horizontal deflection pulses produced by said television system;
    applying said distinct video signal to said CRT's to develop a white vertical bar pattern, made up of different colored images, on said remote viewing surface; and
    setting the distance between said CRT's and said remote surface to attain said overlying relationship in said vertical white bar pattern by observing the departure of said different colored images in said white vertical bar pattern from said overlying relationship.

11. The method of claim 10 wherein said horizontal deflection pulses are regularly spaced and wherein said distinct video signal is delayed by one-half the approximate time between successive horizontal pulses.

* * * * *